United States Patent [19]

Huber et al.

[11] 4,387,029
[45] Jun. 7, 1983

[54] METHOD FOR THE REPROCESSING OF CONDENSATE FROM UREA PRODUCTION PLANTS

[75] Inventors: Adalbert Huber, Holzwickede; Dietrich Schirmer, Iserlohn-Hennen; Heiko Hoffmann, Bergisch-Gladbach, all of Fed. Rep. of Germany

[73] Assignee: UHDE GmbH, Dortmund, Fed. Rep. of Germany

[21] Appl. No.: 325,129

[22] Filed: Nov. 27, 1981

[30] Foreign Application Priority Data

Nov. 27, 1980 [DE] Fed. Rep. of Germany ....... 3044602

[51] Int. Cl.$^3$ ............................................... C02F 1/72
[52] U.S. Cl. ..................................... 210/758; 210/766
[58] Field of Search ............... 210/754, 756, 758, 750, 210/760, 761, 766; 564/63, 73, 38; 159/47.2; 203/31; 423/437, 356

[56] References Cited

U.S. PATENT DOCUMENTS 3,281,464 10/1966 Tsao ..................................... 564/73
3,287,407 11/1966 Zardi ..................................... 564/73

OTHER PUBLICATIONS

Chemical Abstracts, vol. 95, 1981, p. 343, Abstract No. 67417w, Tanaka, H., "Behavior of Urea in Wet Oxidation Treatment".
Chemical Abstracts, vol. 95, 1981, p. 321, Abstract No. 120494x, Inoue, H., "Dissolved Pollutant Removal by Contact Oxidation".

*Primary Examiner*—Ivars C. Cintins
*Assistant Examiner*—Wanda L. Millard
*Attorney, Agent, or Firm*—Wilson, Fraser, Barker & Clemens

[57] ABSTRACT

An improvement in a method for the reprocessing, by oxidation, of condensate obtained in urea production plants and having a urea content of approximately 50 mg/l and a biuret content of approximately 2 mg/l, is disclosed. The improvement comprises performing the oxidation at elevated temperatures and at alkaline pH values; preferably, the oxidation is performed at a temperature greater than 60° C. and a pH value greater than 8.

1 Claim, No Drawings

METHOD FOR THE REPROCESSING OF CONDENSATE FROM UREA PRODUCTION PLANTS

BACKGROUND OF THE INVENTION

1. Field of the Invention

This invention relates to a method for the reprocessing by oxidation of condensate obtained in urea production plants and having a urea content in the order of 50 mg/l and of biuret in the order of 2 mg/l.

2. Description of the Prior Art

Condensate obtained in chemical process plants constitutes a byproduct and is generally too valuable for being discharged as waste fluid.

The production of urea, $(NH_2)_2 CO_4H_2O$, yields a byproduct condensate which contains as impurities up to 200 mg/l of urea and 5 mg/l of biuret. A substantial portion of these impurities can be expelled by boiling to reduce, for example, the urea content to approximately 50 mg/l and the biuret content to about 2 mg/l. This partially purified condensate can be used as feedwater for low-pressure steam boilers.

Modern urea production plants are part of a chemical complex in which heat of reaction is recovered at preferably high operating pressure levels of, for example, 80 to 130 bar, for steam generation in high-pressure steam boilers. Because of the large quantities of reaction heat liberated in large-scale chemical plants, the demand for high-quality boiler feedwater is considerable; therefore, reprocessing of all condensate should be aimed at.

It is also known to convert by oxidation the major portion of the impurities, i.e. urea and biuret, to nitrogen and carbon dioxide with the aid of oxidizing agents such as hypobromite, sodium hypochlorite or nitrous acid. However, this method is unsatisfactory because complete oxidation cannot be achieved at low residual concentrations.

SUMMARY OF THE INVENTION

The object of the invention is to provide a method for reprocessing a condensate obtained in a urea production plant and previously treated by boiling so that it may be used as feedwater for high-pressure steam boilers.

Surprisingly, it was found that the problem can be solved by performing oxidation at elevated temperatures and at alkaline pH values.

A particularly high degree of purity is achieved when oxidation of the condensate to be reprocessed takes place at temperatures above 60° C. and pH values above 8.

Chlorine, ozone, and hypobromite are the preferred oxidizing agents.

DETAILED DESCRIPTION OF THE PREFERRED EMBODIMENT

The following Examples reflect the efficiency of the method according to this invention. Example I does not describe a method according to the invention, but is presented for purposes of comparison.

EXAMPLE I, Conventional Reprocessing

Composition of the test water:

In order to obtain a certain buffer action of the water, the oxidation tests using sodium hypochlorite are not performed with fully demineralized water. Rather, test water consisting of a mixture of one part potable water and 9 parts fully demineralized water to which 15 mg/l urea are added is used for the tests. The pH value is 6.8 and the electrical conductivity 130 $\mu$S/cm.

Chlorine reduction is determined in a first test for rising admix quantities of active chlorine, i.e. the rate of chlorine reduction is a measure for the rate of oxidation. The results are presented in the following Table.*

*All percentages herein are percent by weight, unless otherwise indicated.

| Chlorine reduction (%) after: | Addition of $Cl_2$/, mg | | | | |
|---|---|---|---|---|---|
| | 15 | 30 | 45 | 90 | 15 |
| | Test Water | | | | Blank Trial Without Urea |
| 0.5 hours | 2.6 | 2 | 0 | — | no reduction |
| 1.0 hours | 12 | 11 | 11 | — | no reduction |
| 3.0 hours | 26 | 32 | 31 | — | no reduction |
| 16.0 hours | — | — | — | 61 | no reduction |
| 24.0 hours | 95 | 84.5 | 82 | — | no reduction |
| 40.0 hours | — | — | — | 69 | no reduction |

Another test extends to the chlorination of the test water with subsequent activated carbon treatment and another addition of chlorine, 30 and 60 mg $Cl_2$/l. Chlorine reduction after 16 hours was 90 and 71 percent, respectively. This test water is subjected to an activated carbon treatment, after which active chlorine can no longer be traced. After another addition of the same quantities of chlorine as above, chlorine reduction is again 50% and 33%. The above experimental evidence indicates that the first oxidation was incomplete.

The test series is continued in that the water obtained after the second addition of chlorine is subjected to filtration through an activated-carbon filter and a mixed-bed ion exchanger. Chlorine cannot be traced downstream of the activated-carbon filter, and electrical conductivity downstream of the mixed-bed is 0.05 $\mu$S/cm. The effluent liquid discharged from the mixed-bed and having the foregoing electrical conductivity was again mixed with 30 and 60 mg $Cl_2$/l. Chlorine reduction after 16 hours was 62 and 33.3 percent, respectively.

Despite the excellent conductivity, the liquid still contained oxidizable matter.

EXAMPLE II, Processing According To the Invention

Test water and blank trial are the same as for Example I. The test water is heated to 80° C. and the pH adjusted to a value above 9, e.g. to 9.8 The results are presented in the following Table.

| Chlorine reduction (%) after: | Addition of $Cl_2$/l, mg 120 | |
|---|---|---|
| | Test Water | Blank Trial Without Urea |
| 0.5 hour | 58% | 9.2 |
| 1.0 hour | 85% | 28 |
| 1.5 hours | 86% | 30 |
| 2 hours | 88% | 32 |
| pH value after cooling to 25% C: | | |
| | 7.65 | 9.6 |

After a subsequent filtration with activated carbon in a mixed-bed ion exchanger, the test water had a residual electrical conductivity of 0.05 $\mu$S/cm.

For a final check, the effluent liquid from the mixed-bed filter was again mixed with 120 mg $Cl_2$/l, and chlorine reduction was measured after a residence time of 16 hours at room temperature. This test evidenced, in fact, that chlorine reduction was 0%, i.e. the same value as obtained from the blank trial of Example I.

The technical advance of the instant invention is demonstrated by the reduced fresh water requirements for a combined ammonia and urea production plant. For such a production plant having a capacity of 1000 tons/day ammonia and 1550 tons/day urea, the calculated quantity of reaction water from the urea section is 46 m³/hour and the fresh water quantity required for the total plant is approximately 70 m³/hour, including the water demand for power generation by steam turbine driven generators for the electric motors in the production plant.

If the reaction water from the urea section is reprocessed by the method according to the invention, the fresh water feed rate can be reduced by 46 m³/hour to 24 m³/hour.

What is claimed is:

1. In a method for purifying by oxidation water condensed from steam in a urea production plant and having a urea content of approximately 50 mg/l and a biuret content of approximately 2 mg/l, the improvement which comprises performing the oxidation at a temperature greater than 60° C. and a pH value greater than 8.

* * * * *